April 22, 1969             W. L. PHILLIPS             3,440,604
WEAR INDICATOR FOR BRAKES
Filed Nov. 24, 1967
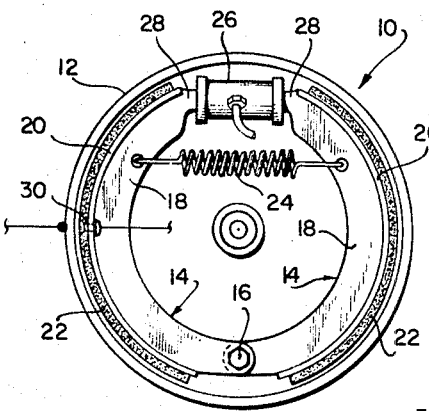
FIG_1
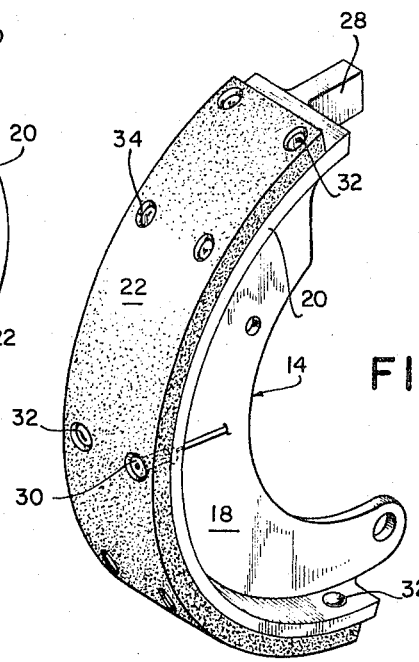
FIG_2
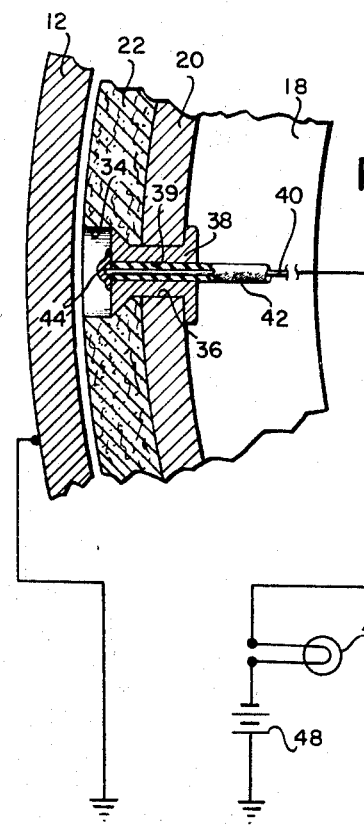
FIG_3
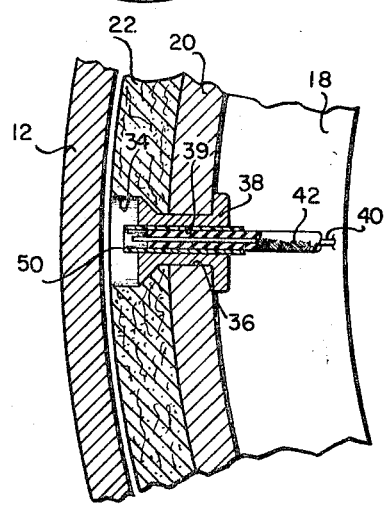
FIG_4
INVENTOR.
WILLIAM L. PHILLIPS
BY
Robert M Vargo
Attorney

United States Patent Office 3,440,604
Patented Apr. 22, 1969

3,440,604
WEAR INDICATOR FOR BRAKES
William L. Phillips, 4821 Forman Ave.,
North Hollywood, Calif. 91601
Filed Nov. 24, 1967, Ser. No. 685,359
Int. Cl. B60q 1/44
U.S. Cl. 340—52     6 Claims

ABSTRACT OF THE DISCLOSURE

A warning device to indicate excessive lining wear on a brake shoe, which includes a rivet having a counterbored head extending into a portion of the lining with an insulated wire extending through the rivet and beyond the rivet head for contact with the brake drum upon a predetermined amount of wear of the lining.

Background of the invention and description of the prior art

This invention relates generally to signalling mechanisms and systems and pertains more particularly to a mechanism adapted to be associated with a vehicle brake shoe for the purpose of apprising the vehicle operator when wear of the brake lining has reached a dangerous point.

It is a not uncommon occurrence in connection with vehicles to have the brake linings thereof wear to such a point that the rivets holding the linings to the brake shoes or the brake shoes themselves engage the brake drums and cause scarring and scuffing thereof. This, of course, necessitates costly repairs to the brake drum as well as replacement of the brake shoe and lining assemblies. The tendency toward such occurrences has been increased in recent years by the use of such mechanisms as overdrives or torque converters in vehicle drives which tend, due to the fact that such devices do not permit the vehicle engine to act as a braking unit, to throw a greater load on the vehicle brakes and cause more rapid wear thereof. Since the inspection of a vehicle's brakes is often neglected, and is at best a troublesome operation, it is common for scarring and damaging of brake drums to occur.

At the present time, the inspection of the condition of brake linings requires that the brake unit or housing enclosing the brake structure be opened in order to make the examination directly, and in the case of automobiles, this requires the relatively laborious process of jacking up the car and removing the wheels, and then reversing these steps after the inspection is complete. While this procedure is merely inconvenient in the case where the brake linings are in a private or pleasure automobile, in commercial vehicles, and fleets of same, such as taxi cabs, trucks, buses and the like, where there is a necessity for a continuous inspection program, this process is laborious, time consuming, inefficient and expensive.

Various wear-indicating devices have been advanced to provide an indication of wear of the lining of a brake shoe to a predetermined replacement point. However, these conventinal devices have suffered from various limitations and disadvantages which have apparently precluded their widespread acceptance in pracitcal use. Heretofore, previous wear-indicating devices have included an electrically conductive point contact imbedded in a brake lining at a predetermined depth beneath the wearing friction surface thereof and in some manner electrically insulated from the lining. The point contact is connected in a ground return series circuit including, for example, a battery and light or equivalent indicator, while the brake drum is connected to ground. The contact and drum thus function as the terminals of a switch which is closed when the brake lining wears down sufficiently to expose the point contact and thereby establish electrical conduction between the contact and drum upon application of the brakes. The light is hence lit as an indication of excessive wear of the lining, requiring replacement. Typically, previous wear-indicating devices have included various means which extend through the brake shoe and into the lining to act as the point contact, but in each instance, such means have been relatively complex, expensive to manufacture, and quite costly to install since special fabrication of the brake shoe would be needed to adapt the warning device to the brake shoe. In most cases a special bore had to be drilled through the brake shoe to permit the device to extend into the lining. Also such a device was usually of such a complex design that the cost of manufacturing it would be prohibitive. In other cases, the rivets which attached the lining to the brake shoe were utilized in adapting the warning device to the brake shoe. However, the means which connected the device to the rivet was cumbersome and the rivet had to specially be adapted to receive such connecting means.

All of these shortcomings made the previous wear-indicator systems commercially unacceptable. What this invention accomplishes is providing a wear-indicating system that is quite simple in its design, economcal to manufacture, convenient to install, and easily adaptable to present day brake systems.

Summary of the invention

A warning device to indicate excessive lining wear on a brake shoe comprising a hollow rivet adapted to be inserted into a bore in a brake shoe, the rivet having a counterbored head extending into a portion of the lining, an insulated wire extending through the rivet and beyond the rivet head for contact with the brake drum upon a predetermined amount of wear of the lining and means at the end of the wire to insulate the wire from the rivet, thereby fulfilling a significant object of this invention, i.e., providing an apparatus for indicating the condition of a brake lining without the necessity of examining or opening the housing enclosing the brake lining.

Another object of this invention is to provide an apparatus for instantaneously indicating when brake linings reach a point of wear when the material must be changed.

Still another object of the invention is to provide an apparatus to test by remote means the condition of brake linings without interfering with the normal operation of the equipment carrying the brake linings.

Various other objects and advantages will appear from the following description of several embodiments of the invention, and the novel features will be particularly pointed out hereinafter in connection with the appended claims.

Brief description of the drawings

FIGURE 1 is a side elevational view of a brake shoe assembly;

FIGURE 2 is a perspective view of a conventional brake shoe showing the invention incorporated thereon;

FIGURE 3 is an enlarged cross-sectional view taken through the brake shoe assembly and showing the contact assembly associated therewith; and FIGURE 4 is an enlarged cross-sectional view of a second embodiment of the contact assembly.

Detailed description of the invention

FIGURE 1 shows a conventional brake shoe assembly, generally indicated at 10, having a rotatable brake drum 12 and a pair of brake shoes 14 pivotally mounted therein at 16. Each brake shoe 14 includes a web portion 18 and a transverse flange 20, the latter of which serves as a support to which a brake lining 22 is rigidly secured either by riveting or by binding. The brake shoes 14 are interconnected adjacent their upper ends by a coil spring 24. An actuator 26 is connected to the upper flanges 28 of the brake shoes 14.

FIGURE 2 shows in larger detail the brake shoe 14 with a contact assembly 30 extending therethrough. In the embodiment shown in FIGURE 2, the lining 22 is attached to the transverse flange 20 by means of rivets 32. The rivets 32 extend into bores 34 of the lining 22 and through the bores 36 of the flange 20 and are secured in the usual manner. The contact assembly 30 is also inserted through one of the bores 34 and 36 of the lining 22 and flange 20. It should be noted that location of the contact assembly is a matter of preference and that more than one assembly could be attached to each shoe, if preferred.

FIGURE 3 shows an enlarged sectional view of one embodiment of the contact assembly which includes a contact rivet 38 which is not unlike any conventional rivet with the exception that a counterbore 39 is formed through the head of the rivet 38 to enable the rivet 38 to have a completely hollow passage extending therethrough. As can be seen, the rivet 38 is embedded in the lining 22 and extends approximately halfway into the bore 34.

A wire 40 extends through the counterbore 39 and slightly beyond, into the bore 34 of the lining 22. The wire 40 is insulated in the usual manner by a layer of insulation 42, which extends to the head of the rivet 36. The portion of the wire 40 that extends into the bore 34 is finally insulated by a section of plastic, or the like, which is fused thereon. The purpose of the insulation covering 44 is to prevent any leakage of current by virtue of accumulation of metal fragments in the bore 34 while the brake is in use. Also this insulation prevents any leakage of current through the liner 22, since the material of the liner 22 may include reinforcing wire and partially conducting material such as carbon or graphite.

The wire 40 is connected to a signal lamp 46, which in turn is connected to a storage battery 48 of the vehicle. Since one side of the battery 48 is grounded, a circuit is formed which is completed through the lamp 46 when the end of the wire 40 which extends into the bore 34 comes into direct electrical engagement with the drum 12.

In operation, ordinarily the circuit of the system is open and there is no leakage whatsoever from the contact assembly 30. However, when the lining 22 wears away to such an extent as to approach an unsafe thinness, the insulation 44 covering the end of wire 40 is stripped away by engagement with the brake drum 12, whereby eventually the end of the wire 40 comes into direct electrical engagement with the adjacent surface of the drum 12, during intervals when the brake is applied. This condition is immediately signalled to the operator by a flashing of the lamp 460.

The embodiment shown in FIGURE 4 is much like that in FIGURE 3 with the exception that a plastic sleeve insert 50 is located within the bore 39 to act as an insulator for the tip of the wire 40. The insert 50 functions in the same manner as the insulation 44 in that the end of the sleeve adjacent the drum 12 is worn away first before the end of the wire 40 comes into electrical engagement with the drum.

The advantages of these embodiments is readily apparent. The installation of either of the contact members is quite simple, involving the steps for the first embodiment of (1) counterboring the rivet head, (2) inserting the tipped wire, and (3) insulating the tip of the wire with a layer of insulation; and for the second embodiment of (1) counterboring the rivet head, (2) inserting the plastic sleeve, and (3) inserting the tipped wire. As can be seen, the cost of fabricating these units is quite relatively inexpensive and could be applied to various standard types of brake linings, at the time these linings are being attached to the brake shoes, or after the lining has been in service. It is also noted that this device can be utilized on all types of brake systems, including disc brakes and conventional drum brakes. The inventive concept affords a device of great simplicity, which will give a positive warning signal when the brakes have been worn away to a predetermined extent. There is no danger of a false signal, and no danger of leakage of current from the battery. The brake lining is not structurally weakened, and after being worn away to such an extent as to afford an indication, it remains serviceable until repairs can be made.

I claim:
1. A contact assembly for an electrical signalling circuit in combination with a brake system which includes a first and second brake member and a lining having one side adapted to be attached to a face of said first brake member with the other side forming a friction surface for engagement with a metal braking surface of said second brake member, said contact assembly comprising:
   a hollow rivet extending through a bore of said first brake member having a head mounted within said lining;
   an electrical conductor extending through said hollow rivet having a portion extending into said lining intermediate the sides thereof; and
   means located on said conductor portion for electrically insulating said conductor from said lining and first brake member, said insulation means being adapted to be worn after a predetermined amount of said lining has been worn away in use to expose said conductor portion for engagement with said second brake member to close the electrical signalling circuit through said contact assembly to indicate such engagement.

2. The invention in accordance with claim 1 wherein said electrical conductor includes an electrical wire having a layer of insulating coating thereon with a portion of the wire extending beyound said coating.

3. The invention in accordance with claim 1 wherein said first brake member comprises a brake shoe and said second brake member comprises a brake drum.

4. The invention in accordance with claim 1 wherein said first and second brake members comprise a complementary pair of disc brake members.

5. The invention in accordance with claim 1 wherein said insulation means comprises a layer of plastic material encapsulating said conductor portion.

6. The invention in accordance with claim 1 wherein said insulating means comprises a hollow plastic sleeve inserted within said hollow rivet and around said conductor portion.

References Cited

UNITED STATES PATENTS

| 2,146,357 | 2/1939 | Schweikle | 340—52 XR |
| 2,217,176 | 10/1940 | Madison | 340—52 |
| 2,731,619 | 1/1956 | Fratus | 200—61.4 |
| 3,271,737 | 9/1966 | Bezemek | 200—61.4 |

ALVIN H. WARING, *Primary Examiner.*

U.S. Cl. X.R.

200—61.4